(12) United States Patent
Liu et al.

(10) Patent No.: US 7,772,172 B2
(45) Date of Patent: Aug. 10, 2010

(54) THIN FILM LUBRICANT FOR ADVANCED TRIBOLOGICAL PERFORMANCE OF STORAGE MEDIUM

(75) Inventors: Jianwei Liu, Fremont, CA (US); Michael Joseph Stirniman, Fremont, CA (US); Huan Tang, Los Altos, CA (US); Jing Gui, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/504,825

(22) Filed: Jul. 17, 2009

(65) Prior Publication Data

US 2009/0297887 A1  Dec. 3, 2009

Related U.S. Application Data

(63) Continuation of application No. 11/104,885, filed on Apr. 12, 2005, now Pat. No. 7,579,304.

(51) Int. Cl.
*C07F 9/6571* (2006.01)
*C08F 8/34* (2006.01)
*F04B 53/00* (2006.01)

(52) U.S. Cl. .................. 508/422; 508/548; 427/558
(58) Field of Classification Search ............ 508/422, 508/548; 427/558, 130
See application file for complete search history.

(56) References Cited

U.S. PATENT DOCUMENTS

| | | | |
|---|---|---|---|
| 5,030,478 | A | 7/1991 | Lin et al. |
| 5,273,830 | A | 12/1993 | Yaguchi et al. |
| 6,096,385 | A | 8/2000 | Yong et al. |
| 6,099,762 | A | 8/2000 | Lewis |
| 6,541,431 | B1 | 4/2003 | Akada et al. |
| 6,608,009 | B2 | 8/2003 | Akada et al. |
| 2003/0215674 | A1 | 11/2003 | Liu et al. |
| 2005/0277558 | A1 | 12/2005 | Deng et al. |

*Primary Examiner*—Walter D Griffin
*Assistant Examiner*—Frank C Campanell
(74) *Attorney, Agent, or Firm*—Arent Fox LLP

(57) ABSTRACT

A lubricant for improving the durability and reliability of recording media used in hard drives is disclosed. The lubricant comprises a perfluoropolyether main chain with a first end attached to a hexa(trifluoromethylphenoxy)cyclotriphosphazene, a second end attached to a bonding enhancer for enhancing bonding between the lubricant and a carbon-containing layer. The bonding enhancer of the lubricant can contain multiple hydroxyl, amide groups, 2,3-dihydroxy-1-propoxyl, acetamide, methacrylate, methyl methacrylate and glycidyl ether. Some bonding enhancers such as methacrylate, methyl methacrylate or glycidyl ether, can be further activated with ultraviolet light.

20 Claims, 7 Drawing Sheets

THIN FILM LUBRICANT FOR ADVANCED TRIBOLOGICAL PERFORMANCE OF STORAGE MEDIUM

CROSS-REFERENCE TO A RELATED APPLICATION

This application is a continuation of prior U.S. patent application Ser. No. 11/104,885; filed on Apr. 12, 2005, now U.S. Pat. No. 7,579,304, entitled "Thin Film Lubricant For Advanced Tribological Performance Of Storage Medium". The subject matter of the related application is hereby incorporated by reference in its entirety.

BACKGROUND OF THE INVENTION

1. The Field of Invention

The present invention relates generally to the field of disc drive storage, and more particularly to lubricants used in disc drives to improve tribological properties.

2. Description of the Related Art

Computer disc drives commonly use components made out of thin films to store information. Both the read-write element and the magnetic storage media of disc drives are typically made from thin films.

FIG. 1 is an illustration showing the layers of a conventional magnetic media structure including a substrate 105, a seed layer 109, a magnetic layer 113, a diamond like carbon (DLC) protective layer 117, and a lube layer 121. The initial layer of the media structure is the substrate 105, which is typically made of nickel-phosphorous plated aluminum or glass that has been textured. The seed layer 109, typically made of chromium, is a thin film that is deposited onto the substrate 105 creating an interface of intermixed substrate 105 layer molecules and seed layer 109 molecules between the two. The magnetic layer 113, typically made of a magnetic alloy containing cobalt (Co), platinum (Pt) and chromium (Cr), is a thin film deposited on top of the seed layer 109 creating a second interface of intermixed seed layer 109 molecules and magnetic layer 113 molecules between the two. The DLC protective layer 117, typically made of carbon and hydrogen, is a thin film that is deposited on top of the magnetic layer 113 creating a third interface of intermixed magnetic layer 113 molecules and DLC protective layer 117 molecules between the two. Finally the lube layer 121, which is a lubricant typically made of a polymer containing carbon (C) and fluorine (F) and oxygen (O), is deposited on top of the DLC protective layer 117 creating a fourth interface of intermixed DLC protective layer 117 molecules and lube layer 121 molecules.

The durability and reliability of recording media is achieved primarily by the application of the DLC protective layer 117 and the lube layer 121. The DLC protective layer 117 is typically an amorphous film called diamond like carbon (DLC), which contains carbon and hydrogen and exhibits properties between those of graphite and diamond. Thin layers of DLC are deposited on disks using conventional thin film deposition techniques such as ion beam deposition (IBD), plasma enhanced chemical vapor deposition (PECVD), magnetron sputtering, radio frequency sputtering or chemical vapor deposition (CVD). During the deposition process, adjusting sputtering gas mixtures of argon and hydrogen varies the concentrations of hydrogen found in the DLC. Since typical thicknesses of DLC protective layer 117, are less than 100 Angstroms, lube layer 121 is deposited on top of the DLC protective layer 117, for added protection, lubrication and enhanced disk drive reliability. Lube layer 121 further reduces wear of the disc due to contact with the magnetic head assembly.

Although conventional lubricants have been used to lubricate disks in hard drive applications, there are problems with using conventional lubricants in media for modern disc drives applications. For example, modern media use much thinner layers and much thinner lubricants than older media from just a few years ago and as the thickness of the protective layers 117 and lube layers 121 are reduced, reliability problems arise. A more integrated protection structure is needed that will produce a more durable protective film without effecting thicknesses. Reliability of hard disks is heavily depended upon the durability of the thin film media.

Lubrication additives, such as Bis(4-fluorophenoxy)-tetrakis(3-trifluoromethyl phenoxy)cyclotriphosphazene (X1P), have been used to improve tribological performance and corrosion resistance of thin film media. Although these new lubricant that contain additives are an improvement over old lubricants, there are still many tribological problems associated with them including lubricant pick-up, head smear, high stiction, and other problems resulting from weak bonding of the lubricant and carbon-containing overcoat. Additionally, since lubricants contain ingredients, that deteriorate tribological performance, if allowed to build up on the medium, the chemical compositions of both the lube bath and lubricant film on the medium must be closely monitored to prevent unexpected fall-off of tribological performance.

Therefore what is needed is a lubricant that overcomes these problems, provides better tribological performance and provides desirable properties. Desirable properties include a resulting lubricant that does not have problems such as phase separation, lubricant pick-up, head smear, high stiction, etc.

SUMMARY OF THE INVENTION

These limitations are overcome by using a lubricant having a perfluoropolyether main chain with a first end attached to a hexa(trifluoromethylphenoxy)cyclotriphosphazene, a second end attached to a bonding enhancer for enhancing bonding between the lubricant and a protective carbon-containing overcoat layer. The bonding enhancer of the lubricant can contain multiple hydroxyl, amide groups, 2,3-dihydroxy-1-propoxyl, acetamide, methacrylate, methyl methacrylate and glycidyl ether.

In one embodiment of the invention the bonding enhancer of the lubricant is activated when exposed to ultraviolet light. For example, if the bonding enhancer is methacrylate, methyl methacrylate or glycidyl ether, then ultraviolet light can be used to activate the bonding enhancer.

In another embodiment, the lubricant contains a compound having the formula:

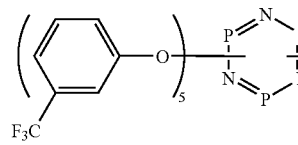 —OCH$_2$CF$_2$(OCF$_2$CF)$_p$(OCF$_2$)$_q$OCF$_2$CH$_2$O— 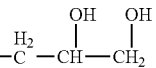

Another embodiment of the invention comprises a magnetic recording media containing a lubricant having a perfluoropolyether main chain with a first end attached to a hexa(trifluoromethylphenoxy)cyclotriphosphazene, a second end attached to a bonding enhancer for enhancing bonding between the lubricant and a carbon-containing layer. The magnetic recording media can further include a substrate, a magnetic layer for recording information, a protective carbon-containing overcoat for protecting the magnetic layer, and a lubricant deposited over the protective overcoat.

Another embodiment of the invention comprises a hard drive used for storing information containing a magnetic recording media comprising a magnetic layer, a protective carbon-containing overcoat, and a lubricant having a perfluoropolyether main chain with a first end attached to a hexa (trifluoromethylphenoxy)cyclotriphosphazene, a second end attached to a bonding enhancer for enhancing bonding between the lubricant and a carbon-containing layer. The hard drive used for storing information further includes a transducer for recording and retrieving information from said magnetic recording media; and a motor for rotating the magnetic recording media.

These and various other features as well as advantages which characterize the present invention will be apparent upon reading of the following detailed description and review of the associated drawings.

BRIEF DESCRIPTION OF THE INVENTION

DETAILED DESCRIPTION OF THE PREFERRED EMBODIMENTS

The invention provides a system and method for protecting magnetic media. The invention is directed to a lubricant and a magnetic media structure having the lubricant. The magnetic media structure includes the new lubricant that has been deposited over a magnetic media structure both with and without ultraviolet (UV) light for enhancement.

Figure 1:
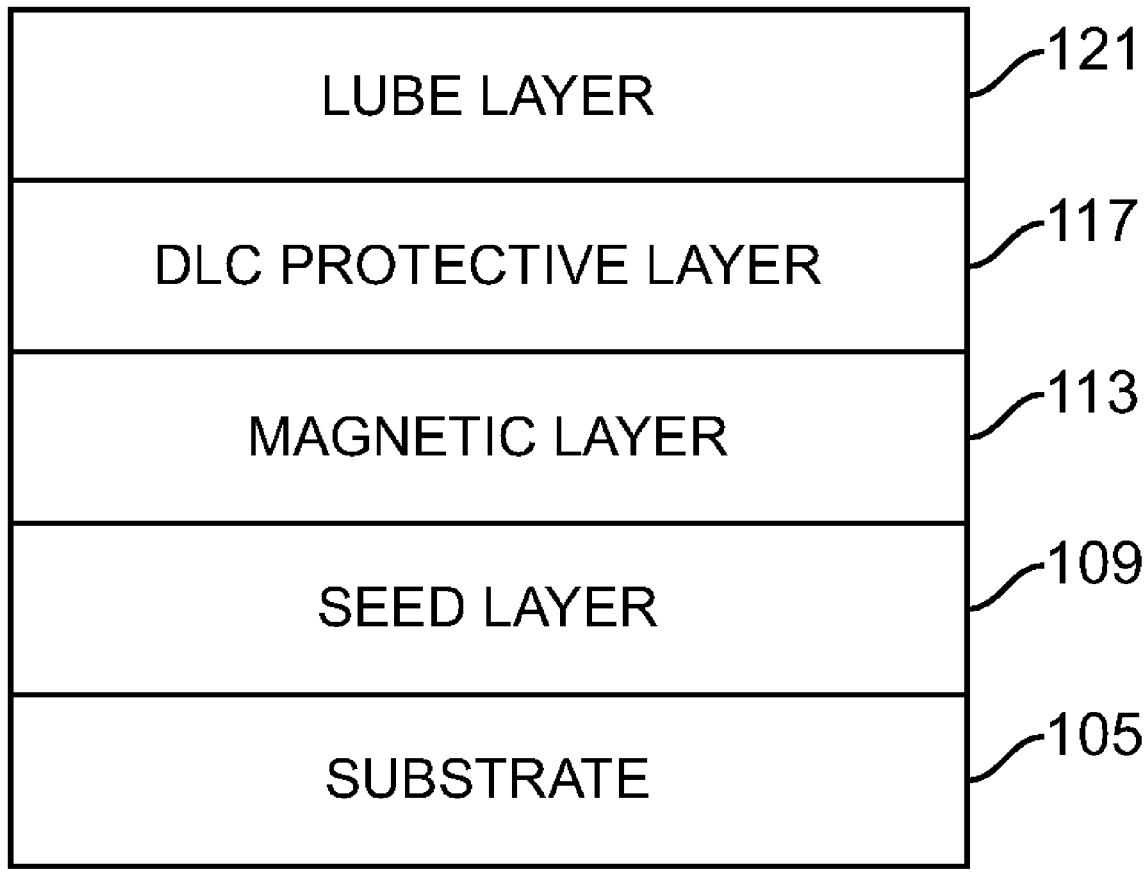
FIG. 1 is a block diagram showing a prior art conventional magnetic media structure with a lubricant layer.
Figure 2:
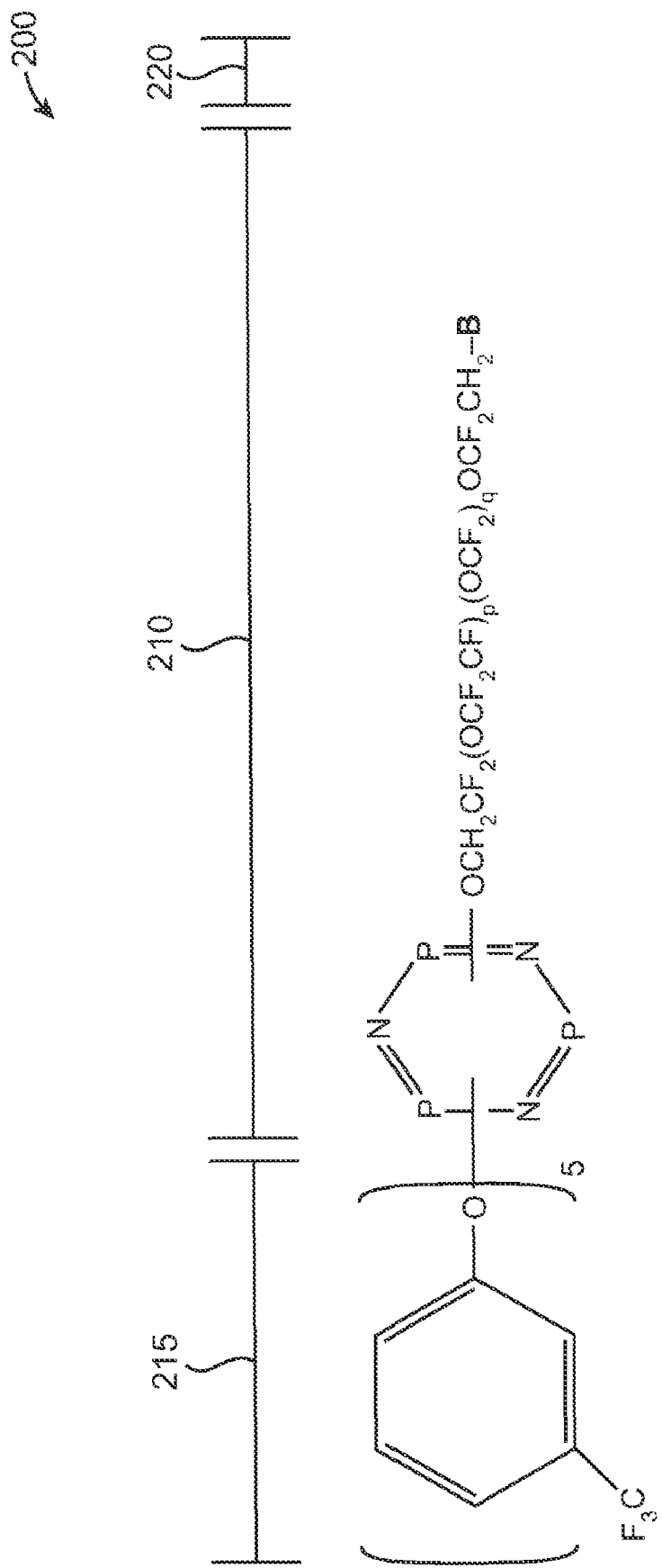
FIG. 2 shows a chemical structure of a lubricant made in accordance with one embodiment of the invention.

FIG. 2 shows a chemical structure of a lubricant 200 made in accordance with one embodiment of the invention. The chemical structure of lubricant 200 includes a perfluoropolyether (PFPE) main-chain 210 with one end attached to a hexa(trifluoromethylphenoxy)cyclotriphosphazene 215, and the other end attached to a bonding enhancing group B 220 that can enhance bonding on a carbon-containing overcoat. The hexa(trifluoromethylphenoxy)cyclotriphosphazene 215 provides the medium good durability. The bonding enhancing group B 220 can include chemical groups with multiple hydroxyl, amide groups or chemical groups such as 2,3-dihydroxy-1-propoxyl, acetamide, methacrylate, methyl methacrylate and glycidyl ether. The bonding enhancing group B 220 compounds have the property of being strongly bonded to a carbon-containing overcoat. Specifically, the methacrylate, methyl methacrylate and glycidyl ether compounds bond strongly to a carbon-containing overcoat when activated by being exposed to ultraviolet (UV) light whereas the 2,3 dihydroxy-1-propoxyl compounds bond strongly to a carbon-containing overcoat without being exposed to UV light. Additionally, attaching bonding enhancing chemical group B 220 can make purification of the resulting lubricants easier by using a liquid chromatography process.

Figure 3:
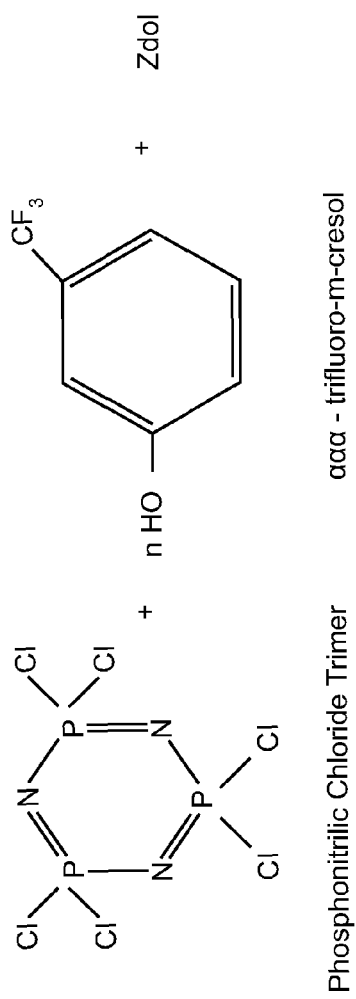
FIG. 3 shows a schematic procedure used to synthesize an Xt-PFPE lubricant, which contains a 2,3-dihydroxy-1-propoxyl, in accordance with one embodiment of the invention.
Figure 3:
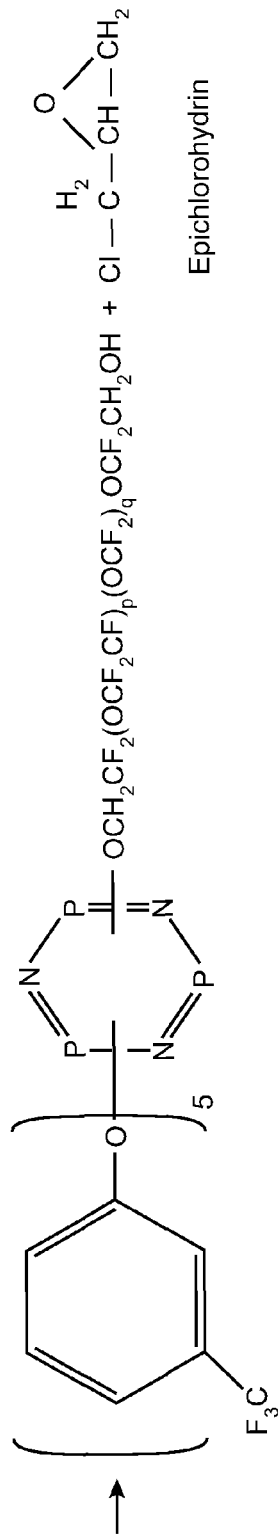
Figure 3:
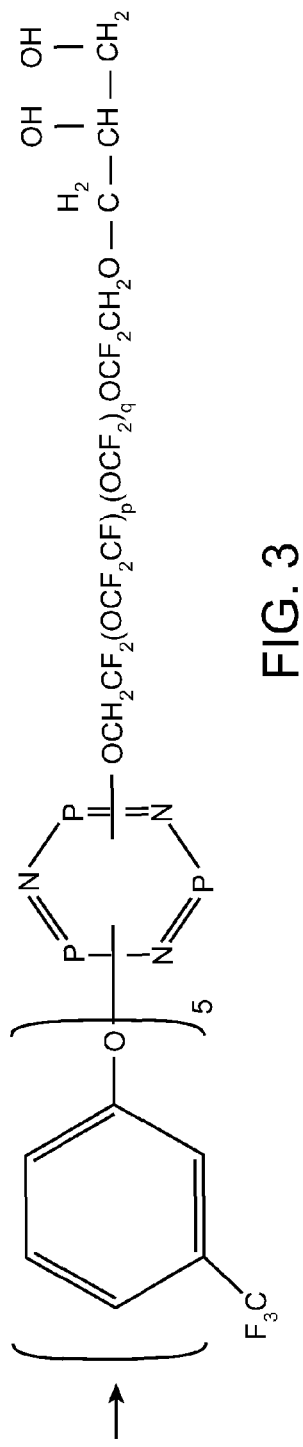

FIG. 3 shows a schematic procedure used to synthesize an Xt-PFPE lubricant, which contains a 2,3-dihydroxy-1-propoxyl, in accordance with one embodiment of the invention. Xt-PFPE lubricant is synthesized by first dissolving Zdol and trifluoro-m-cresol in stoichiometric ratio in a mix solution of Vertrel Xf and tetrahydrofuran. Sodium hydride powder is added slowly. Phosphonitrilic chloride trimmer in tetrahydrofuran is added dropwise and the system is refluxed for more than three days to allow the reaction to be finished. Next, excess amounts of epichlorohydrin are added slowly with a syringe, followed by addition of excess amounts of KOH aqueous solution. Next, the solution is poured into a 1N KOH aqueous solution, which opens the epoxy ring to form a 2,3-dihydroxy-1-propoxyl group. After washing the product with brine solution and de-ionized water multiple times, and distillation to get rid of solvent, a crude oil is obtained. Next, further purification of the crude oil is performed using liquid chromatography. Xt-PFPE can be easily separated from reaction byproducts when using Vertrel Xf as the eluant. Finally, the lubricant is fractionated to obtain a fraction with desirable molecular weight and distribution using Supercritical Fluid Extraction.

Figure 4A:
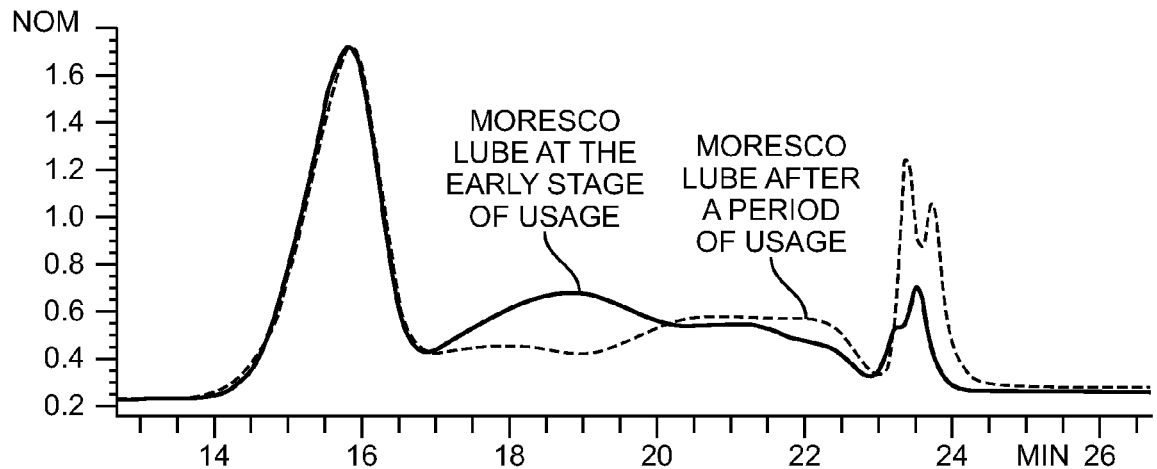
FIG. 4A is a graph showing Gel Permeation Chromatography spectra for a conventional lubricant in a lube-bath as a function of time at various stages of usage.

FIG. 4A is a graph showing Gel Permeation Chromatography (GPC) spectra for a conventional lubricant in a lube-bath as a function of time at various stages of usage. GPC Graph 410 shows GPC data for the conventional lubricant at the early stages of usage whereas GPC Graph 420 shows GPC data for the same conventional lubricant after a period of usage. The difference between GPC Graph 410 and GPC Graph 420 shows that the chemical composition of a conventional lubricant changes over time. For example, the peak seen in GPC Graph 410 around 19 minutes is significantly reduced if not eliminated in GPC Graph 420. Similarly the peak located around 23-24 minutes is significantly bigger for GPC Graph 420 then it is for GPC Graph 410. Additionally, GPC Graph 410 and GPC Graph 420 show that the conventional lubricant contains multiple components whose composition changes over time. This change in the conventional composition is attributed to irregular tribological performance of the lubricant.

Figure 4B:
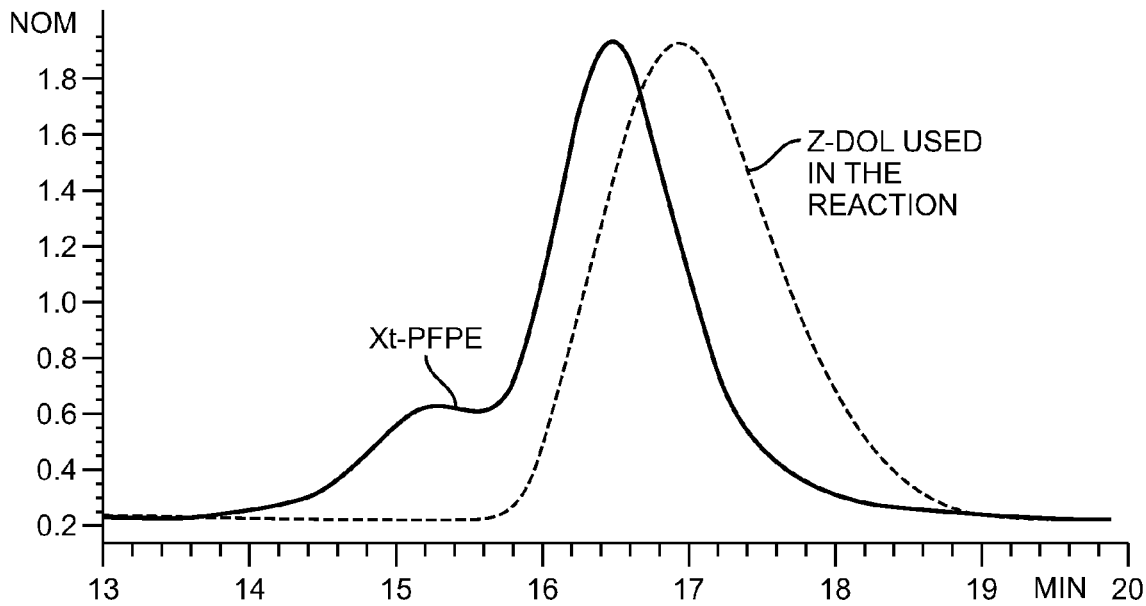
FIG. 4B is a graph showing Gel Permeation Chromatography spectra for Xt-PFPE lubricant in a lube-bath as a function of time at various stages of usage.

FIG. 4B is a graph showing Gel Permeation Chromatography spectra for Xt-PFPE lubricant in a lube-bath as a function of time at various stages of usage. GPC Graph 430 shows GPC data for Xt-PFPE lubricant in a lube-bath at the early stages of usage whereas GPC Graph 440 shows GPC data for Zdol used in the reaction. GPC Graph 430 shows that Xt-PFPE has a much simpler chemical composition than does the conventional lubricant. The simpler chemical composition of the Xt-PFPE lubricant provides a lube-bath with a constant chemical composition, which does not change with time as much as the composition of the conventional lubricant.

Figure 5:
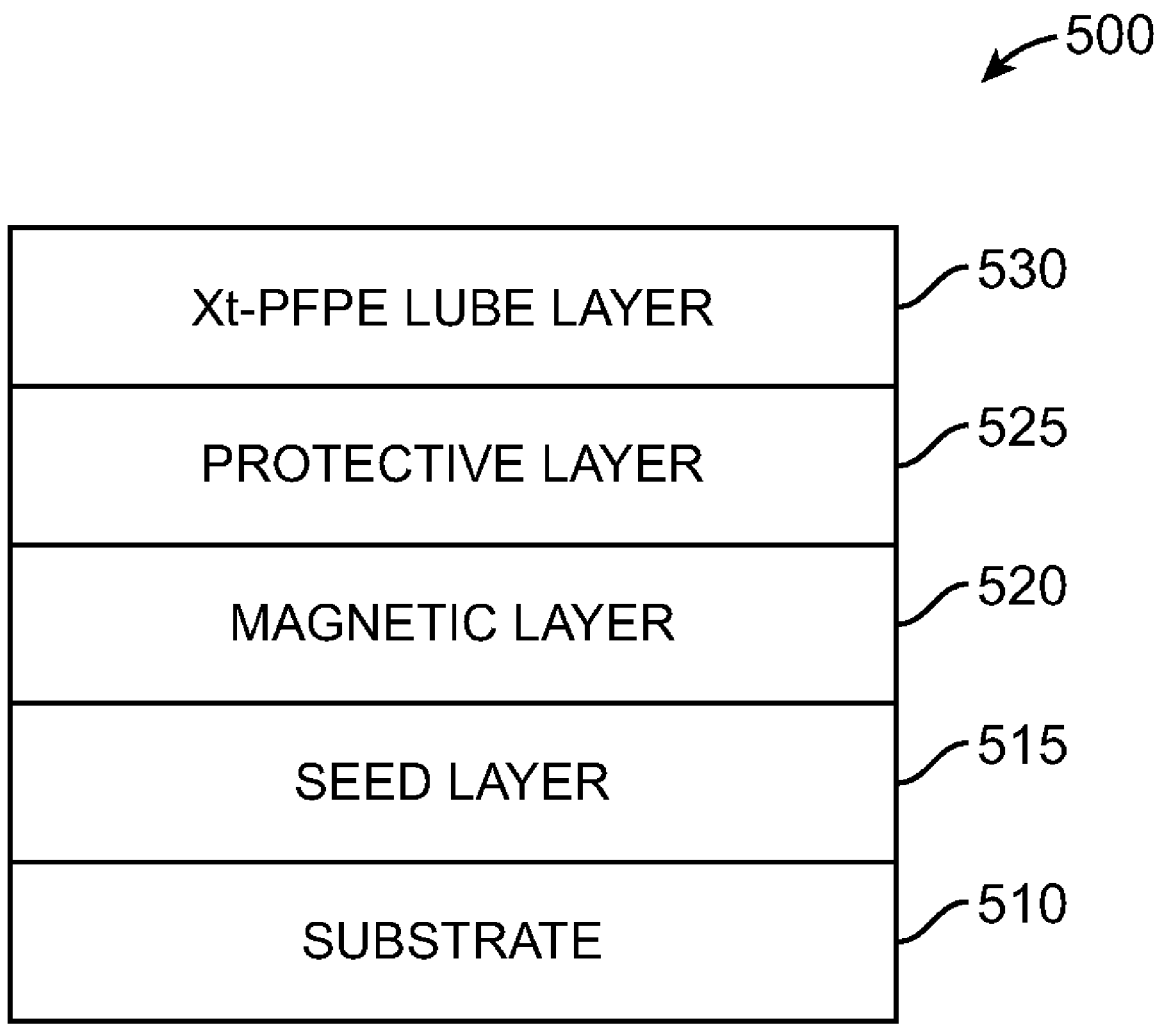
FIG. 5 is a block diagram showing a magnetic media structure having lubricant layer made with the chemical structure of FIG. 2 above.

FIG. 5 is a block diagram showing an Xt-PFPE lubrication layer 530 in a magnetic media 500 in accordance with one embodiment of the invention. Magnetic media 500 includes a substrate 510, a seed layer 515, a magnetic layer 520, a protective overcoat layer 525, and an Xt-PFPE lubrication layer 530. The substrate 510 is typically made of nickel-phosphorous plated aluminum or glass that has been textured. The seed layer 515, typically made of chromium, is a thin film that is deposited onto the substrate 510 creating an interface of intermixed substrate 510 layer molecules and seed layer 515 molecules between the two. The magnetic layer 520 is typically made of one or more magnetic alloys comprising cobalt (Co), platinum (Pt) and chromium (Cr). Additionally, magnetic layer 520 can be a thin film structure made of magnetic alloy and spacer layers. Magnetic Layer 520, is a thin film or stack of thin films deposited on top of the seed layer 515.

Protective overcoat layer 525 is typically made of a carbon-containing material such as diamond-like-carbon (DLC), nitrogenated carbon, or nitrogenated DLC. The protective overcoat 525 is typically deposited over magnetic stack 520 using conventional thin film deposition techniques including ion beam deposition (IBD), plasma enhanced chemical vapor deposition (PECVD), magnetron sputtering, radio frequency sputtering, or chemical vapor deposition (CVD). In one embodiment, the DLC protective layer 525 is prepared by ion beam deposition using a work gas is $C_2H_2$. The energy per C atom is 90 eV.

Xt-PFPE lubrication layer 530 includes hybrid lubricant films containing a perfluoropolyether (PFPE) main-chain 210 with one end attaching to a hexa(trifluoromethylphenoxy) cyclotriphosphazene 215, and the other end to a bonding enhancing group B 220 that can enhance bonding between the Xt-PFPE lubricant and the carbon-containing overcoat, as described with reference to FIG. 2. Conventional lubrication processes such as dipping can be used to apply the lubricant. Lubricant layer 530 can be applied both with and without exposure to UV light depending on the enhancing group B 220. Since lubricant layer 530 bonds to the carbon-containing overcoat better than conventional lubricants, lubricant pickup is reduced; head smear is reduced; fly stiction is improved; and CSS durability of thin film storage media is improved. Evidence that the stronger bonding between the Xt-PFPE lubricant and the carbon-containing overcoat reduces lubricant pick-up and head smear is presented below with reference to FIG. 6 and FIG. 7.

Magnetic media 200 with Xt-PFPE lubrication layer 530 can also be used in a disc drive to give improved performance. A disc drive using a magnetic-media 500 with Xt-PFPE lubrication layer 530 also includes a motor for spinning the magnetic media at many thousand revolutions per minute about its center of rotation, a transducer for magnetically reading and writing information on the magnetic media while the magnetic media is rotated about its center axis. Those skilled in the art will recognize that other components needed to construct a disk drive such as the housing and Head-Stack-Assembly are also included and all are maintained within a housing. The Xt-PFPE lubrication layer 530 permits the transducer, which is mounted on a glide assembly, to glide over the rotating disk reliably for long periods of time.

Figure 6:
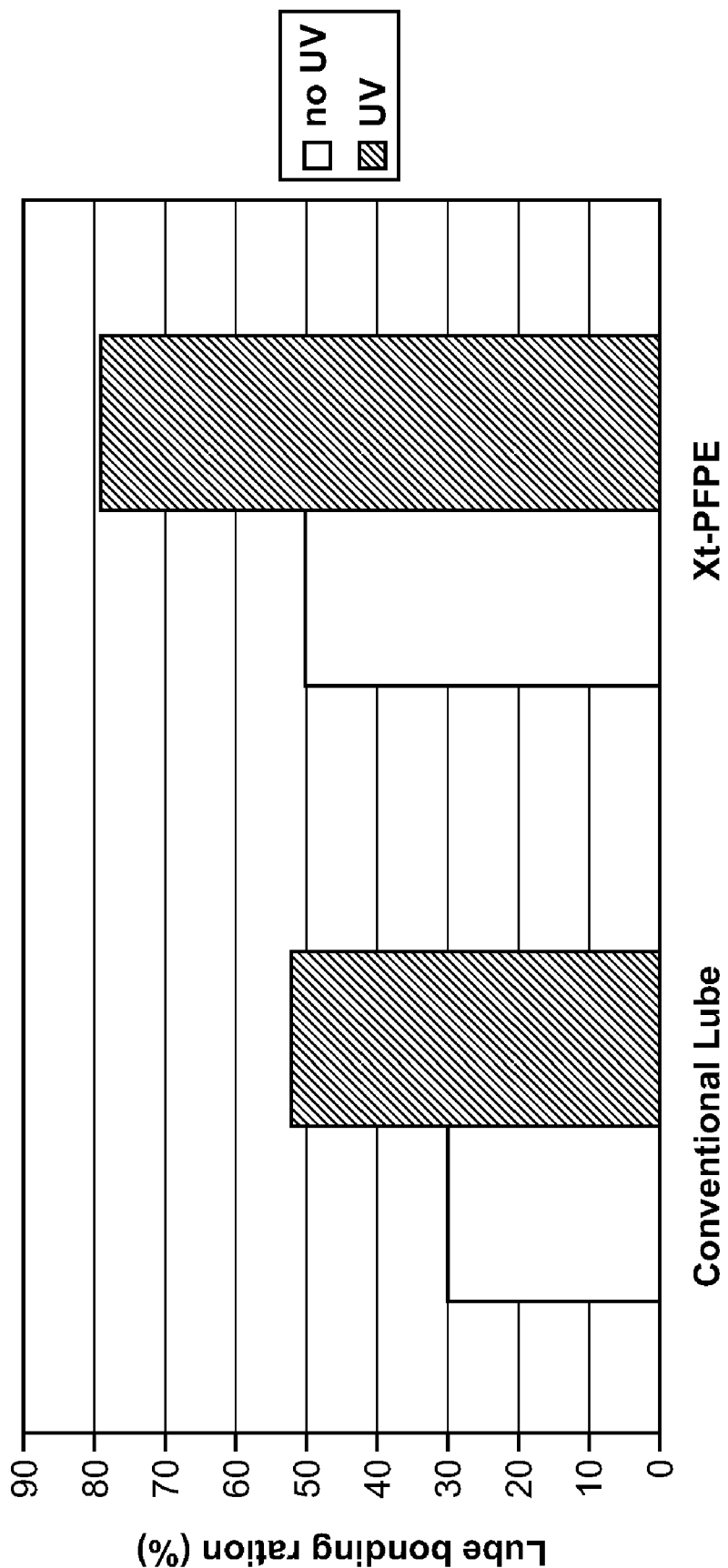
FIG. 6 shows the Lube Bonding Ratio (%) for a conventional lubricant and Xt-PFPE both with and without ultraviolet light exposure.

FIG. 6 is a bar graph showing and comparing the lube bonding ratio (%) of a conventional lubricant and Xt-PFPE lubricant, both with and without ultraviolet light (UV) exposure. The bonded lubricant thickness data of FIG. 6 is measured after excessive lubricant, often called "free lubricant," is washed off the disks by using vapor condensation of lubricant solvents such as Vertrel Xf. The percentage of the bonded lubricant thickness in the total lubricant thickness is called lubricant bonding ratio. The graph shows that the lube bonding ratio for a conventional lubricant is about 30% without exposure to UV light and about 52% with exposure to UV light. The graph also shows that the lube bonding ratio for Xt-PFPE lubricant is about 50% without exposure to UV light and about 79% with exposure to UV light. A comparison of the graphs shows 1) the lube bonding ratio for Xt-PFPE is higher than for a conventional lubricant when neither are treated with UV light, 2) the lube bonding ratio for Xt-PFPE is higher than for a conventional lubricant when both are treated with UV light, 3) the lube bonding ratio for Xt-PFPE is higher than for a conventional lubricant when Xt-PFPE is treated with UV light but the conventional lubricant is not treated with UV light, and 4) the lube bonding ratio for Xt-PFPE is similar to that of a conventional lubricant when Xt-PFPE is not treated with UV light but the conventional lubricant is treated with UV light. The FIG. 6 graphical data also suggests that even if a conventional lubricant is subjected to UV light its lube bonding ratio can only be made as high as the Xt-PFPE ratio without exposure to UV light.

Therefore, several advantages of using an Xt-PFPE lubricant are that a higher lube bonding ratio can be obtained and if a lower lube bonding ratio is desired then the step of exposing the lubricant to UV light can be eliminated because Xt-PFPE has a higher lube bonding ratio than a conventional lubricant without UV exposure.

The UV exposure process is performed using mercury-discharging lamps and involves using a process chamber that is purged with Nitrogen during the process to prevent Ozone formation. The process time is varied to control the desired outcome and typically ranges from 10 to 120 seconds.

Figure 7A:
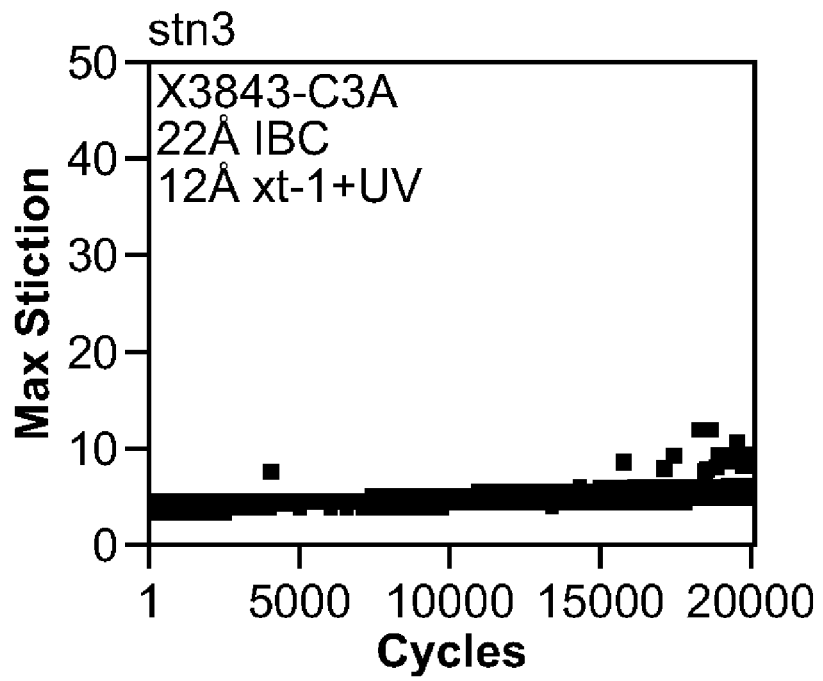
FIG. 7A and FIG. 7B are graphs showing Contact Stop Start (CSS) testing data for magnetic media lubricated with Xt-PFPE lubricant, in accordance with one embodiment of the invention.
Figure 7B:
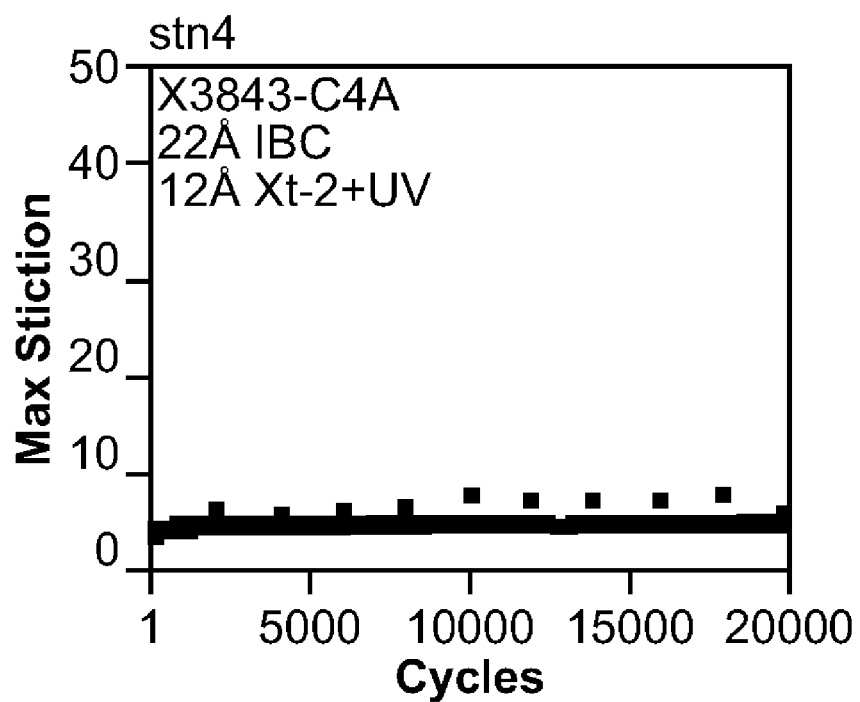

FIG. 7A and FIG. 7B are graphs showing Contact Stop Start (CSS) testing data for two magnetic media samples lubricated with Xt-PFPE lubricant, in accordance with one embodiment of the invention. FIG. 7A shows that Xt-PFPE lubricated media has very low stiction for cycles less than 15000 and only a slightly higher stiction for cycles above 15000. Similarly, FIG. 7B shows very low stiction for almost all cycles except for the occasional small increase in stiction at a few isolated cycles. Overall, FIG. 7A and FIG. 7B show that the Xt-PFPE lubricated media demonstrates promising CSS durability as well as low stiction in aggressive environmental conditions on thin carbon-containing overcoat.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

What is claimed:

1. A magnetic recording media, comprising:
   a substrate;
   a magnetic layer for recording information disposed on the substrate;
   a protective overcoat for protecting said magnetic layer, said overcoat comprising carbon; and
   a lubricant, comprising:
   a perfluoropolyether main chain having a first end and a second end;
   a hexa(trifluoromethylphenoxy) cyclotriphosphazene attached to said first end of perfluoropolyether main chain; and
   a bonding enhancer attached to said second end of perfluoropolyether main chain for enhancing bonding to the overcoat, the bonding enhancer selected from the group consisting of multiple hydroxyl groups, multiple amide groups, acetamide, methacrylate, methyl methacrylate and glycidyl ether.

2. The magnetic recording media of claim 1, wherein the lubricant is subjected to ultraviolet light exposure for between 10 seconds and 120 seconds.

3. The magnetic recording media of claim 1, wherein the bonding enhancer, responsive to exposure to ultraviolet light, is capable of increased bonding to the overcoat, compared with its bonding capability without ultraviolet light exposure.

4. The magnetic recording media of claim 1, wherein the bonding enhancer is a 2,3-dihydroxy-1-propoxyl compound.

5. The magnetic recording media of claim 1, wherein said lubricant comprises a compound having the formula 6. The magnetic recording media of claim 1, wherein the lubricant is characterized by a lubricant bonding ratio of between about 50% and 79% to the overcoat after exposure to ultraviolet light.

7. A recording media, comprising:
   a substrate;
   a layer for recording information disposed on the substrate;
   a protective overcoat for protecting said layer, said overcoat comprising carbon; and
   a lubricant comprising
   a perfluoropolyether main chain having a first end and a second end;
   a hexa(trifluoromethylphenoxy)cyclotriphosphazene attached to said first end of perfluoropolyether main chain;
   a bonding enhancer attached to said second end of perfluoropolyether main chain for enhancing bonding to the overcoat; and
   said bonding enhancer selected from the group consisting of methacrylate, methyl methacrylate and glycidyl ether.

8. The recording media of claim 7, wherein the bonding enhancing activity of said bonding enhancer is capable of increase by exposure to ultraviolet light.

9. The recording media of claim 7, wherein the lubricant is subjected to ultraviolet light exposure for between 10 seconds and 120 seconds.

10. The recording media of claim 7, wherein between about 50% to 79% of an amount of lubricant initially applied to the overcoat bonds to the overcoat upon application of ultraviolet light.

11. The recording media of claim 7, wherein the bonding enhancer is capable of increased adherence, to the overcoat, of about 50%, measured as a lubricant bonding ratio, responsive to exposure to ultraviolet light.

12. The recording media of claim 7, wherein the bonding enhancer is capable of a lubricant bonding ratio of about 79%, responsive to the exposure to ultraviolet light.

13. A recording media, comprising:
    a substrate;
    a layer for recording information disposed on the substrate;
    a protective overcoat for protecting the layer, said overcoat comprising carbon; and
    a lubricant comprising:
    a perfluoropolyether main chain having a first end and a second end;
    a hexa(trifluoromethylphenoxy)cyclotriphosphazene attached to said first end of perfluoropolyether main chain;
    a bonding enhancer attached to said second end of perfluoropolyether main chain for enhancing bonding on a carbon-containing overcoat; wherein
    said bonding enhancer is other than a single terminal alcohol group and provides increased capability of adhering

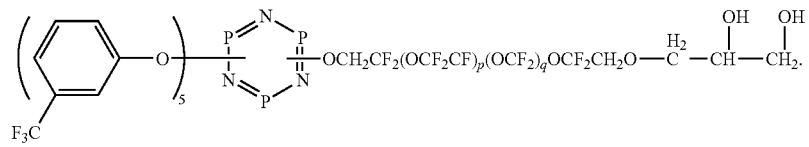

the lubricant to the overcoat, compared with an otherwise identical lubricant terminating with a single alcohol group.

14. The recording media of claim 13, wherein the bonding enhancer is selected from the group consisting of multiple hydroxyl groups, multiple amide groups, acetamide, methacrylate, methyl methacrylate and glycidyl ether.

15. The recording media of claim 13, wherein the bonding enhancer is a 2,3-dihydroxy-1-propoxyl compound.

16. The recording media of claim 13, wherein the bonding enhancing activity of said bonding enhancer is capable of increase by exposure to ultraviolet light.

17. The recording media of claim 13, wherein the lubricant is subjected to ultraviolet light exposure for between 10 seconds and 120 seconds.

18. The recording media of claim 17, wherein after the ultraviolet light exposure, the lubricant is characterized by a lubricant bonding ratio of between about 50% and 79%.

19. The magnetic recording media of claim 13, wherein the bonding enhancer is capable of increased adherence of about 50%, measured as a lubricant bonding ratio, responsive to exposure to ultraviolet light.

20. The magnetic recording media of claim 13, wherein the bonding enhancer is capable of a lubricant bonding ratio of about 79%, responsive to the exposure to ultraviolet light.

* * * * *